(12) United States Patent
Saldana

(10) Patent No.: US 7,316,530 B2
(45) Date of Patent: Jan. 8, 2008

(54) MOTORCYCLE TRANSPORT TIE-DOWN SYSTEM

(76) Inventor: Darrell Saldana, 911 Carlse Ave., Torrance, CA (US) 90503

( * ) Notice: Subject to any disclaimer, the term of this patent is extended or adjusted under 35 U.S.C. 154(b) by 18 days.

(21) Appl. No.: 11/223,189

(22) Filed: Sep. 9, 2005

(65) Prior Publication Data

US 2006/0257223 A1 Nov. 16, 2006

Related U.S. Application Data

(60) Provisional application No. 60/680,336, filed on May 12, 2005.

(51) Int. Cl.
*B60P 3/06* (2006.01)
(52) U.S. Cl. .......................................................... 410/3
(58) Field of Classification Search ................... 410/2, 410/3, 77, 85, 101, 109, 106, 108, 115, 156
See application file for complete search history.

(56) References Cited

U.S. PATENT DOCUMENTS

| | | | |
|---|---|---|---|
| 3,591,029 A | 7/1971 | Coffey | |
| 3,753,579 A | 8/1973 | Kurilich, Jr. | |
| 5,025,932 A | 6/1991 | Jay | |
| 6,575,310 B2 | 6/2003 | Chamoun | |
| 6,616,388 B1 | 9/2003 | Floe | |
| 6,802,493 B2 | 10/2004 | Lance | |
| 6,902,363 B2 | 6/2005 | Couto | |
| 2004/0051089 A1 | 3/2004 | Lance | |
| 2004/0084491 A1 | 5/2004 | Gibson | |
| 2006/0159541 A1* | 7/2006 | Fullenkamp | 410/3 |
| 2006/0171790 A1* | 8/2006 | Macomber, III | 410/3 |

* cited by examiner

*Primary Examiner*—H Gutman
(74) *Attorney, Agent, or Firm*—Lauson & Schewe LLP; Robert J. Lauson; Edward C. Schewe

(57) ABSTRACT

A motorcycle (or similar vehicle) transport tie-down system utilized an apparatus including a base track attachable to a truck or trailer bed and a pair of upright posts that adjustably engage the track, and each post has a longitudinal hole and one or more openings crossing the longitudinal hole. There is a rod member having an elongate body for insertion into the post longitudinal hole, and the rod has a number of projecting ribs and a cap portion to engage a motorcycle foot peg. There are further one or more latching or locking pins for insertion into the openings and engaging the rod between the ribs. Once the apparatus is erected, a motorcycle may be positioned on the bed over the track and the posts engaged to the track and moved adjacent the foot pegs. Then the rods engaged to the foot pegs and inserted into the posts, and the pins inserted into the posts thereby preventing movement of the motorcycle relative the bed for transport. Preferably the track is configured like a ramp so the motorcycle can be easily moved across, and preferably the motorcycle is pushed down slightly prior to being locked in place such that through its shock absorbers it is spring loaded.

17 Claims, 4 Drawing Sheets

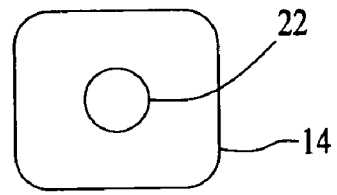
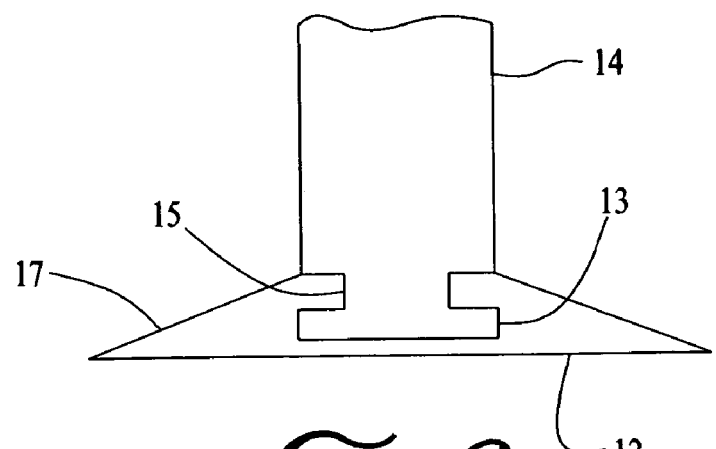
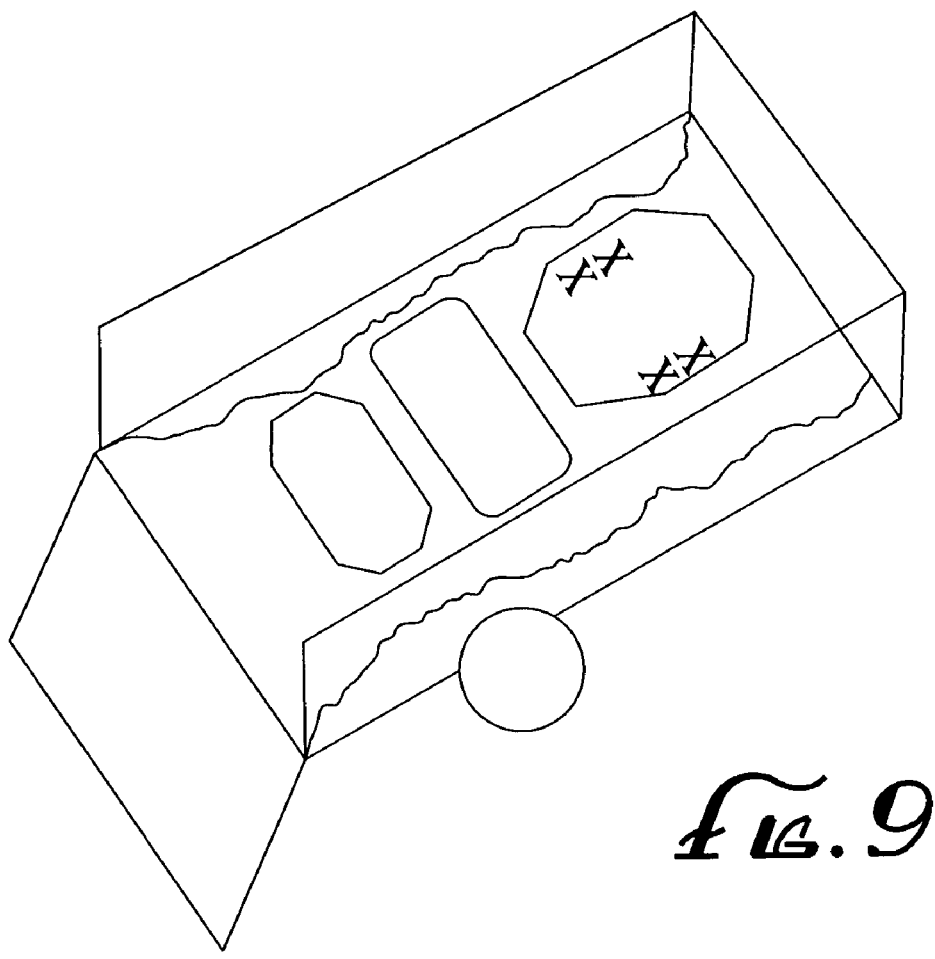

MOTORCYCLE TRANSPORT TIE-DOWN SYSTEM

CROSS REFERENCE TO RELATED APPLICATIONS

This application is based on provisional patent application Ser. No. 60/680,336 filed May 12, 2005.

BACKGROUND OF THE INVENTION

1. Field of the Invention

This invention related generally to securing wheeled vehicles for transport, and more particularly to tying down such a vehicle (e.g. a motorcycle) at its foot pegs (or other structure) for transport by truck or trailer.

2. Description of the Related Art

Motorcycles, dirt bikes, and all sorts of 2, 3, and 4-wheeled vehicles (ATV's such as dune buggies, trikes, quads, etc.) are popular for recreation, particularly off-the-road in remote areas. Many motorcyclists or users of such vehicles prefer the comfort and safety of small trucks or automobiles for longer trips and going through urban areas, however. Hence, they have the need to transport their bikes in the back of a pick-up truck or in a small utility trailer hitched to a car, which has posed a challenge. For example, a motorcycle is a massive object weighing perhaps 500-1500 pounds and containing several gallons of fuel, and thus it is burdensome to transport and safety is an important consideration.

Traditionally motorcycles have strapped down their bikes in all sorts of haphazard ways. Such installations are dependent upon the skill of the installer, and the straps or ropes tend to loosen over time meaning the motorcycle is subject to tipping over while being transported which may lead to damage of the motorcycle, fuel spills and other problems. Some existing specialty trailers or structures for installation into trucks may facilitate motorcycle transport, but these trailers and trucks typically include such structure that interferes with use of the vehicles for other tasks. Additionally, some of these systems are complex and may require more than one person to load or unload the motorcycle.

Objects of the Invention

Accordingly, it is an object of the present invention to develop a secure and simple way to transport motorcycles (or the like) in a pick-up truck or small utility trailer.

It is a further object of the present invention to develop a structure of securing a motorcycle to a truck or trailer that is effective and inexpensive to manufacture.

It is a still further object of the present invention to develop transport structures for motorcycles for installation into a truck bed or trailer that will not interfere with other typical uses of such vehicles.

It is a still further object of the present invention to develop transport structures for motorcycles that are easily installed and used by a single person.

These and other objects of the present invention will become apparent upon reading the following detailed description and upon reference to the accompanying drawings.

SUMMARY OF THE INVENTION

An apparatus to tie down a motorcycle or other wheeled vehicles, at its foot pegs, floor board or other structure, for transport in a truck or trailer bed, includes a base track attachable to the bed and a pair of upright posts configured to slidably or otherwise adjustably engage the track. Each post has a longitudinal hole and a second opening crossing the longitudinal hole. The apparatus further includes a rod member having an elongate body for insertion into the longitudinal hole of the post, the body having a number of projecting spaced-apart ribs, and further configured to engage a motorcycle foot peg. The apparatus still further includes a latching pin for insertion into the second opening and selectively engaging the rod member between a pair of the ribs in the rod member.

Preferably the second opening in the posts is configured to allow movement of the latching pin from engaging the projecting ribs to disengaging the projecting ribs, preferably aided by a spring between the latching pin and post to bias the latching pin to engaging the rod member. Also preferably each post has a third crossing the longitudinal hole for a locking pin, the third opening positioned such that the locking pin is engaged between a selected pair of the ribs preventing movement of the rod member. Preferably the rod member body is generally cylindrically shaped with a plurality of generally circumferential ribs around the rod member, and the top end has an enlarged cap portion for retaining the motorcycle foot pegs. Finally, the base track is preferably configured with sloping sides to form a ramp such that the motorcycle can be easily moved across.

A method of securing a motorcycle (or the like) to a truck or trailer bed for travel in a generally forward direction includes mounting a base track to the bed, preferably generally transverse across the bed perpendicular to the forward direction of travel. The method further includes engaging and sliding a pair of upright posts to be spaced apart along the track. The motorcycle is positioned with its foot pegs (or other structure) between the posts, and the posts each moved to adjacent a foot peg. Then the posts are engaged to the foot pegs, preferably by inserting a rod through the foot pegs and into the posts and locking the rod in place. Preferably the motorcycle is pushed down slightly prior to the locking step such that through its shock absorbers it is spring loaded.

BRIEF DESCRIPTION OF THE SEVERAL VIEWS OF THE DRAWINGS

FIG. 7 is a top view of the upright posts;

FIG. 8 is a side view of the upright post engaging the track; and,

FIG. 9 is a perspective view of a typical truck bed showing the safe areas to mount the track.

LISTING OF REFERENCE NUMERALS

| tie-down apparatus | 10 |
|---|---|
| base track | 12 |
| upright post | 14 |
| rod member | 16 |
| track slot | 13 |
| post slot | 15 |
| inclined side | 17 |
| latching pin | 18 |
| front slot | 20 |
| longitudinal hole | 22 |
| second hole | 24 |
| tension spring | 26 |
| set screw | 28 |
| locking pin | 30 |
| upper hole | 32 |
| lower hole | 34 |
| cap portion | 36 |
| body portion | 38 |
| projecting ribs | 40 |
| bolt fasteners | 42 |

DESCRIPTION OF THE PREFERRED EMBODIMENTS

Figure 1:
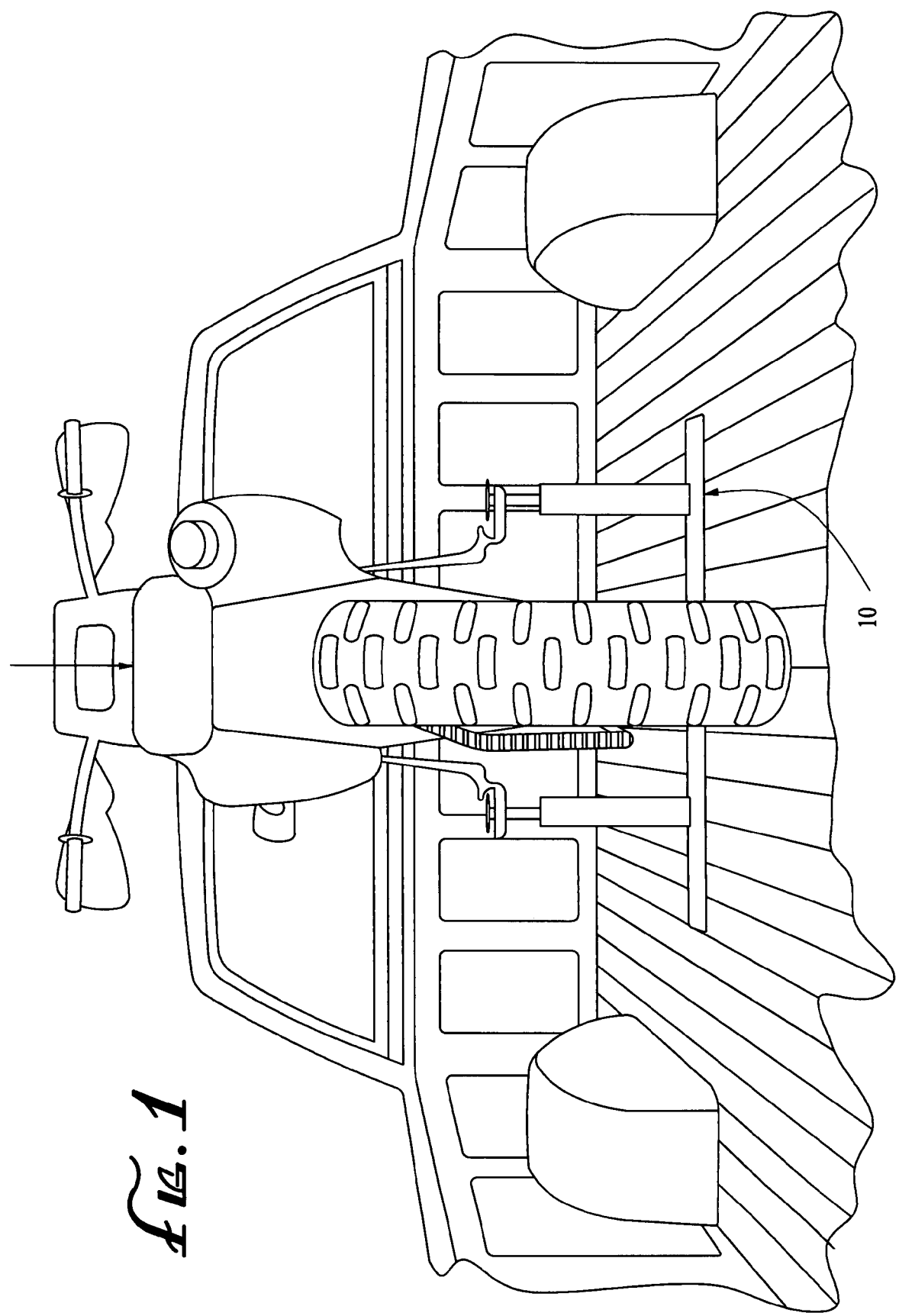
FIG. 1 is a perspective view of a motorcycle tied down at its foot pegs to a truck bed in accordance with the preferred embodiment of the present invention.
Figure 2:
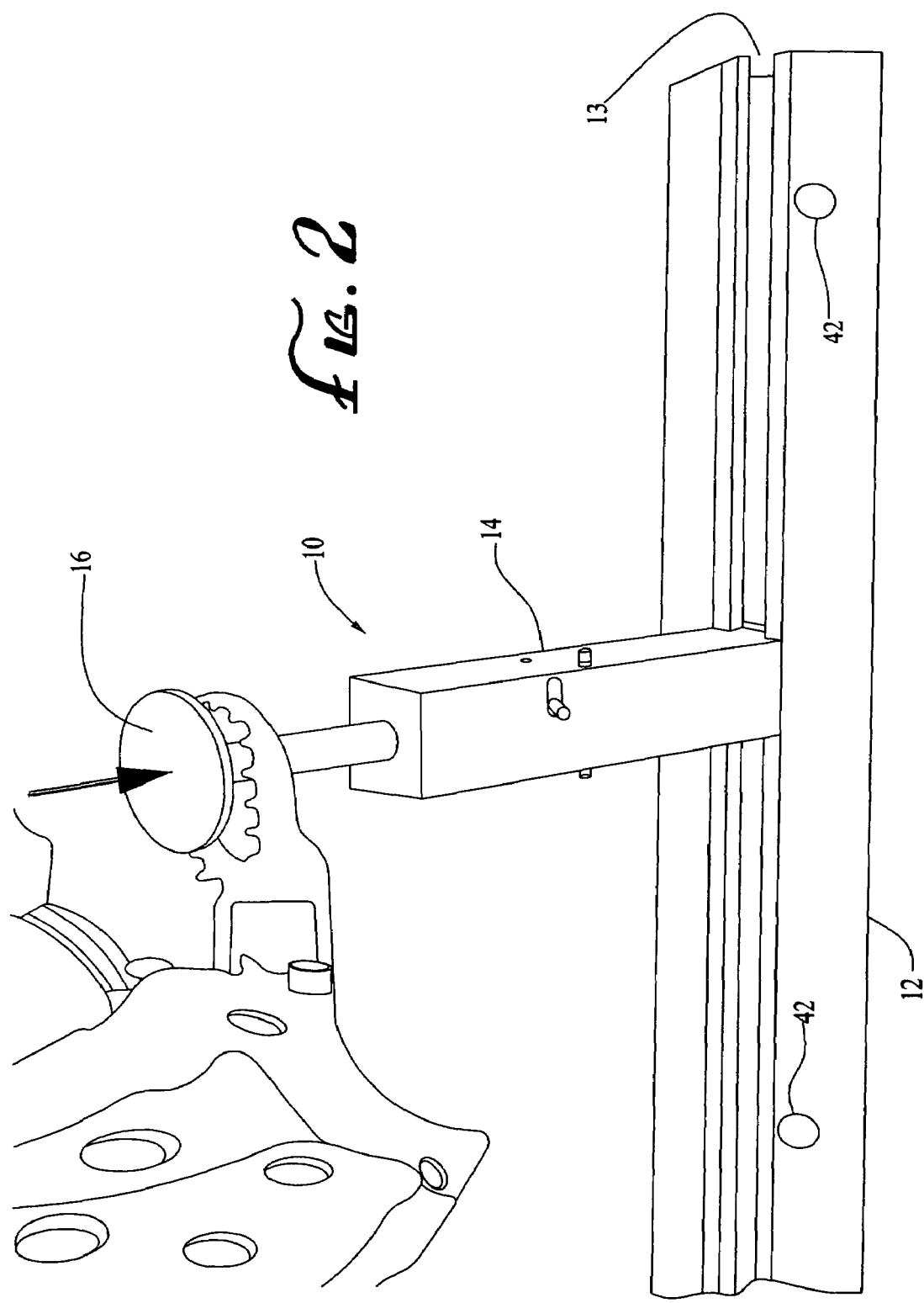
FIG. 2 is a perspective view of the motorcycle foot peg engaged by the apparatus of the preferred embodiment.
Figure 3:
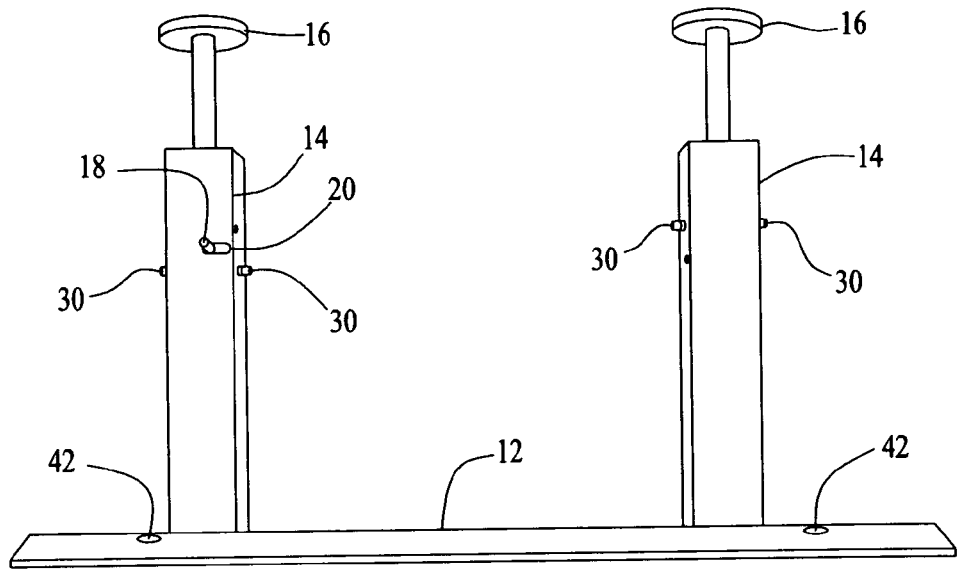
FIG. 3 is a perspective view of the apparatus including a track and pair of posts with articulating rods.

Initially referring to FIGS. 1, 2, shown is a conventional motorcycle in a conventional truck bed with the tie-down apparatus 10 and using the securing method of the preferred embodiment of the present invention. The apparatus 10 includes a base track 12 that mounts to the truck bed, and an upright post 14 that slidably engages the track 10. In FIG. 2 a rod member 16 is shown placed through the motorcycle foot peg and inserted into the post 14.

Now also referring to FIGS. 3-8, further details of the apparatus 10 are depicted. The track 12 is configured with a slot 13 running the length of the track, while the post 14 is configured with a corresponding slot 15, such that the two pieces fit and nest together as shown in FIG. 8. Also as shown the track 12 preferably has two inclined sides 17 to form a ramp. The post 14 includes a latching pin 18 sized to be inserted into a slot 20 that intersects in part a longitudinal hole 22 (FIG. 7) that runs the length of the post 12. There is also a second hole 24 across the front portion of the post 12 (FIGS. 5, 6) that houses a tension spring 26 with eyelets on each end and connected to the latching pin 18 and an embedded set screw 28. Also shown is a locking pin 30 that may be inserted into either the upper hole 32 or the lower hole 34, both of which intersect the through hole 22.

Figures 4, 5, 6:
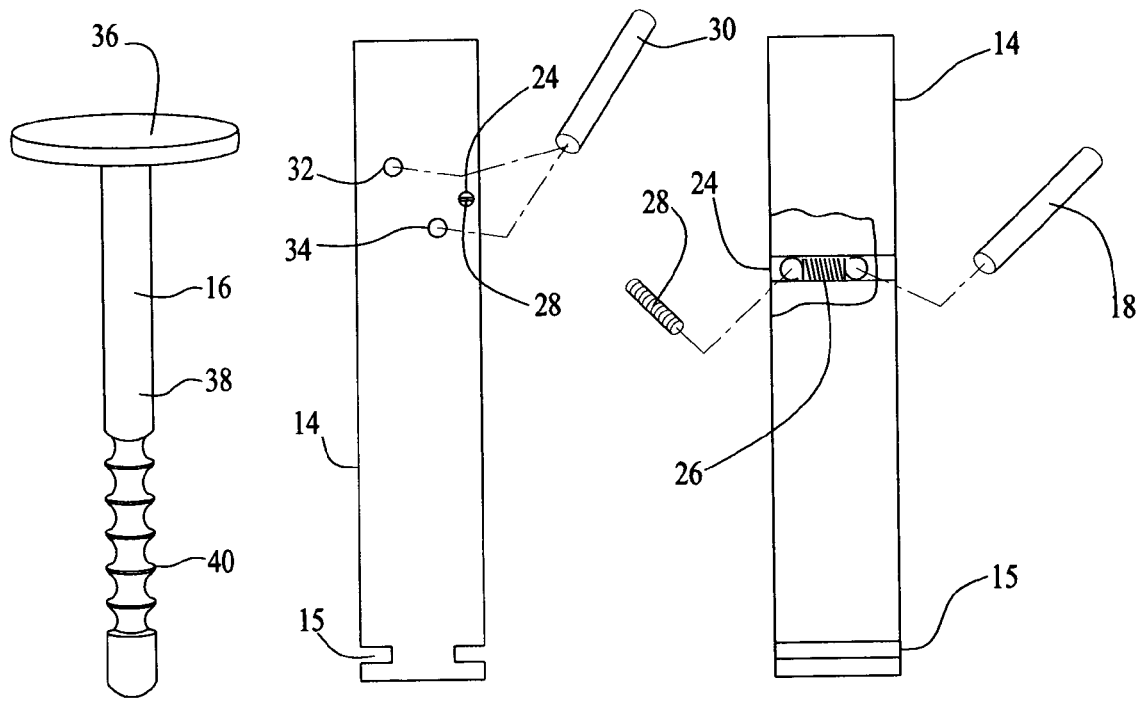
FIG. 4 is an enlarged perspective view of the rod member.
FIG. 5 is a side elevation view of the upright post also showing the locking pin.
FIG. 6 is front view of the upright post also showing the latching pin, and with a portion of the front face cut away revealing an attached spring.

Primarily referring to FIG 4, shown is the rod 16 having a cap portion 36 and a cylindrical body portion 38 with a narrower lower end but having about a half-dozen circumferential projecting ribs 40. The track 12 is mounted to the truck bed by conventional bolt fasteners 42 (FIG. 3), and as needed flat bottom plate (not shown) may be inserted beneath the track 12 if the truck bed surface underneath is uneven in any respect. FIG. 9 shows two octagon-shaped areas that may be preferred to mount the track 12, away from electrical lines along the side and the gas tank generally about in the middle below the truck bed.

Having described the structure of the apparatus of the preferred embodiment, its function, operation and use may now be discussed. The base track 12 having been mounted to a truck or trailer bed, a motorcycle front wheel is run over the track 12 and the motorcycle positioned such that the foot pegs lie over the track 12 (FIG. 1). The upright posts 12 were previously or are now engaged with the track 12 and slid together to be directly adjacent the foot pegs. The rod member 16 is inserted through the foot pegs and into the posts (FIG. 2).

Next the latching pin 18 is either finger toggled to the right in the slot 20, or with sufficient downward force on the cap 36 of the rod 16 the latching pin 18 will move out of the way of the projecting ribs 40. Preferably, downward pressure may also be exerted on the motorcycle seat by leaning over the bike at the same time to compress the motorcycle shock absorbers. Once the rod 16 is positioned the tension spring 26 will pull the latching pin 18 back into place between a pair of the projecting ribs 40. Then a locking pin 30 may be inserted (in the upper 32 or lower 34 hole, depending on the depth of penetration of the rod 16 in the post 12) that also engages the rod 16. The locking pin 30 could include a keyed lock of some sort (not shown) as an additional security measure, to keep the bike locked to the truck.

The procedure is then repeated for the other foot peg and post 12. To unload the bike after transport, the above steps are merely reversed. The posts 12 can be removed from the track 12, the rods 16 reinserted back into the post 12 along with the latching 18 and locking 30 pins, and all these parts stored together in a convenient carrying case (not shown) in the truck glove compartment. The track 12 can be left fixedly mounted in place in the truck bed and will be there for the next use, without in the meantime interfering with other uses of the truck for carrying cargo.

The present invention has been described in connection with preferred and alternate embodiments, but it is understood that modifications will occur to those skilled in the appertaining arts that are within the spirit of the invention disclosed and within the scope of the claims.

What is claimed is:

1. An apparatus to tie down a motorcycle at its foot pegs for transport in a truck or trailer bed comprising:
   a track attachable to the bed having a longitudinal slot;
   a pair of upright posts having a lower end configured to slidably engage the longitudinal slot of the track;
   each post having a longitudinal hole and a second opening transverse the longitudinal hole;
   a rod member having a body of an elongate length and sized to be inserted into the longitudinal hole of the post, the body having a plurality of projecting ribs spaced apart along the length of the body;
   the rod member further configured to engage the motorcycle foot pegs; and
   a latching pin sized to be inserted in the second opening and selectively engaging the rod member between a selected pair of the projecting ribs;
   whereby, the motorcycle may be positioned on the bed and the posts slidably engaged in the track adjacent the foot pegs, and the rod members engaged to the foot pegs and inserted into the posts and the latching pins inserted in the posts thereby preventing any movement of the motorcycle relative the bed for transport.

2. The apparatus of claim 1 wherein the second opening is configured to allow movement of the latching pin from engaging the projecting ribs to disengaging the projecting ribs.

3. The apparatus of claim 2 further comprising a spring between the latching pin and post to bias the latching pin to engaging the rod member.

4. The apparatus of claim 1 wherein the post has a third opening transverse the longitudinal hole, and further comprising a locking pin sized to be inserted into the third opening, the third opening positioned such that the locking pin is engaged between the selected pair of the ribs preventing movement of the rod member.

5. The apparatus of claim 1 wherein the rod member body is generally cylindrically shaped with a plurality of generally circumferential ribs around the rod member.

6. The apparatus of claim 1 wherein the rod member has a top end with an enlarged cap portion for retaining the motorcycle foot pegs.

7. The apparatus of claim 1 wherein the track is configured with sloping sides to form a ramp such that the motorcycle can be easily moved across the track.

8. A device to secure a small wheeled vehicle to a larger transport vehicle comprising:
   a base mounted to the transport vehicle;
   a post configured to engage the base, the post having a longitudinal hole and a second opening crossing the longitudinal hole;
   a rod for each post having an elongate lower end sized to insert in the longitudinal hole, and having a projection along the lower end, the rod further having an upper end configured to engage the small wheeled vehicle; and
   a latching pin for each post sized to be inserted in the second opening and selectively engaging the projection of the rod.

9. The device of claim 8 wherein the base is configured to engage said posts to secure the wheeled vehicle in two places.

10. The device of claim 8 wherein the base and post are configured to adjustably engage such that the relative position of the posts may vary.

11. A method of securing a two-wheeled vehicle to a truck or trailer bed for travel in a generally forward direction comprising:
   mounting a track to the bed; adjustably engaging a pair of upright posts to be spaced apart along the track;
   positioning foot pegs of the two-wheeled vehicle between the upright posts;
   moving each of the posts adjacent to one of the foot pegs of the two-wheeled vehicle; and,
   engaging the posts to the adjacent two-wheeled vehicle foot pegs.

12. The method of claim 11 wherein mounting of the track is generally transverse across the bed perpendicular to the forward direction of travel.

13. The method of claim 11 wherein the engaging the posts comprises the steps of inserting a rod through the adjacent two-wheeled vehicle foot pegs and inserting the rod into the upright posts.

14. The method of claim 13 further comprising the step of locking the position of the rod relative the post.

15. The method of claim 14 further comprising the step of depressing the motorcycle prior to the locking step.

16. A method of transporting a wheeled vehicle in a truck or trailer bed comprising:
   mounting a track to the bed;
   slidably engaging a pair of upright posts to be spaced apart along the track;
   positioning post engaging structure of the wheeled vehicle between the upright posts;
   sliding each of the posts adjacent to the post engaging structure of the wheeled vehicle; and,
   engaging the posts to the wheeled vehicle post engaging structure.

17. The method of claim 16 further comprising:
   disengaging the posts from the wheeled vehicle;
   sliding the posts away from the post engaging structure of the wheeled vehicle;
   moving the wheeled vehicle from between the upright posts; and,
   slidably disengaging the upright post from the track.

* * * * *